United States Patent [19]

Seymour et al.

[11] 4,011,286
[45] Mar. 8, 1977

[54] POLYETHERESTER-RADIAL TELEBLOCK COPOLYMER BLEND MOLDING COMPOSITION

[75] Inventors: Robert W. Seymour; Freddie A. Shepherd; Theodore F. Gray, Jr., all of Kingsport, Tenn.

[73] Assignee: Eastman Kodak Company, Rochester, N.Y.

[22] Filed: July 16, 1976

[21] Appl. No.: 705,964

[52] U.S. Cl. .............................. 260/873; 260/40 R; 260/876 R; 260/876 B

[51] Int. Cl.$^2$ ....................................... C08L 67/06

[58] Field of Search ........... 260/873, 876 R, 876 B, 260/40 R

[56] References Cited

UNITED STATES PATENTS

| | | | |
|---|---|---|---|
| 3,013,914 | 12/1961 | Willard | 154/43 |
| 3,023,192 | 2/1962 | Shivers | 260/75 |
| 3,281,383 | 10/1966 | Zelinski et al. | 260/23.7 R |
| 3,405,198 | 10/1968 | Rein et al. | 260/873 |
| 3,435,093 | 3/1969 | Cope | 260/873 X |
| 3,723,574 | 3/1973 | Brinkman et al. | 260/873 |
| 3,763,109 | 10/1973 | Witsiepe | 260/75 R |
| 3,953,394 | 4/1976 | Fox et al. | 260/40 R |
| 3,963,802 | 6/1976 | Shih | 260/873 |
| 3,980,610 | 9/1976 | Conard | 260/40 R |

FOREIGN PATENTS OR APPLICATIONS 1,814,073   7/1969   Germany ................... 260/873

OTHER PUBLICATIONS

T878,004, Sept. 1970, Seaton et al., 260/615 B.

*Primary Examiner*—Murray Tillman
*Assistant Examiner*—T. DeBenedictis, Sr.
*Attorney, Agent, or Firm*—D. B. Reece, III; Charles R. Martin

[57] ABSTRACT

A composition comprised of a polyetherester and a radial teleblock copolymer. This composition exhibits the combination of a desirable overall balance of general mechanical properties and an unobviously high elastic recovery.

7 Claims, No Drawings

POLYETHERESTER-RADIAL TELEBLOCK COPOLYMER BLEND MOLDING COMPOSITION

This invention relates to compositions which can be molded into articles having a combination of a desirable overall balance of general mechanical properties and an elastic recovery which is unobviously high.

The use of thermoplastic polymers for molding useful articles has increased tremendously in the last several decades. Today the wide variety of articles molded from thermoplastic polymers ranges from small articles to large articles, from articles for low strength service to articles for high strength service and from articles not requiring high elastic recovery to articles requiring high elastic recovery.

One of the most desirable classes of thermoplastic polymers for molding articles for high elastic recovery applications is polyesters modified with poly(alkylene oxide) glycols, often called polyetheresters. Polyetheresters are reasonable in cost, can be handled easily, can be molded with little difficulty and exhibit a desirable overall balance of general mechanical properties as well as some degree of elastic recovery.

One of the most desirable polyetheresters for molding articles requiring high elastic recovery is a poly(tetramethylene terephthalate) type polyester modified with a poly(alkylene oxide) glycol. Another desirable polyetherester for molding articles requiring high elastic recovery is a poly(1,4-cyclohexylenedimethylene terephthalate) type polyester modified with a poly(alkylene oxide) glycol. Both of these types of polyetherester are desirable for molding articles because these polyesters exhibit a desirable overall balance of general mechanical properties, such as tensile strength, flexural modulus and the like, as well as high elastic recovery. Although articles molded from these polyetheresters do exhibit high elastic recovery, there is still a need to increase the elastic recovery for very high elastic recovery applications. Although there are materials that can be added to polyetheresters to increase the elastic recovery, these materials typically modify the overall balance of general mechanical properties such that the overall balance of general mechanical properties is no longer acceptable.

We have now invented compositions that can be molded into articles which have a combination of a desirable overall balance of general mechanical properties and an exceptionally high elastic recovery.

The compositions of this invention can be very broadly regarded as comprised of an admixture of a poly(tetramethylene terephthalate) type polyetherester or a poly(1,4-cyclohexylenedimethylene terephthalate) type polyetherester and a radial teleblock copolymer.

The compositions of this invention are thought to be patentable because the compositions exhibit a combination of a very high elastic recovery and a desirable overall balance of other mechanical properties which would be unobvious over the elastic recovery and overall balance of general mechanical properties that one would expect of these compositions in view of the combination of the elastic recovery and overall balance of general mechanical peoperties of similar compositions of these polyetheresters and diblock copolymers similar to the radial teleblock copolymer. Specifically, an admixture of these polyetheresters and a styrene/butadiene diblock copolymer has a poor overall balance of general mechanical properties and a moderate elastic recovery. An admixture of these polyetheresters with a styrene/butadiene radial teleblock copolymer has a good overall balance of general mechanical properties and a very high elastic recovery.

The composition of this invention can be broadly described as a composition comprised of, based on the weight of the composition, an admixture of A. from 95 to 50 weight percent of a polyetherester having an inherent viscosity of at least 0.4 selected from the group consisting of
  1. a first polyetherester comprised of
     A. a dicarboxylic acid component comprised of
        a. 100–60 mole percent terephthalic acid, and
        b. 0–40 mole percent of an aliphatic or aromatic dicarboxylic acid having a molecular weight of less than 300, and
     B. a diol component comprised of
        a. a glycol comprised of 100–60 mole percent tetramethylene glycol and 0–40 mole percent of an aliphatic or aromatic glycol having a molecular weight of less than 300, and
        b. 10–60 weight percent, based on the weight of the polyetherester, of a poly(alkylene oxide)glycol having 2, 3, or 4 carbon atoms in the repeating unit and having a molecular weight in the range of 400 to 5,000,
     wherein the sum of the total mole percent amount of aliphatic or aromatic dicarboxylic acid having a molecular weight of less than 300 in part A.(1)(A)(b), the mole percent amount of aliphatic or aromatic glycol having a molecular weight of less than 300 in part A.(1)(B)(a), and the weight percent, based on the weight of the polyetherester, of the poly(alkylene oxide)glycol in part A.(1)(B)(b) equals at least 35 but does not exceed 80,
  2. a second polyetherester comprised of
     A. a dicarboxylic acid component comprised of
        a. 100–60 mole percent terephthalic acid, and
        b. 0–40 mole precent of an aliphatic or aromatic dicarboxylic acid having a molecular weight of less than 300, and
     B. a diol component comprised of
        a. a glycol comprised of 90–60 mole percent 1,4-cyclohexanedimethanol and 10–40 mole percent ethylene glycol or tetramethylene glycol, and
        b. 10–50 weight percent, based on the weight of the polyetherester, of a poly(alkylene oxide)glycol having 2 to 4 carbon atoms in the repeating unit and having a molecular weight in the range of 400 to 2,000,
B. from 5 to 50 weight percent of a radial teleblock copolymer prepared by a method which comprises polymerizing monomers selected from the group consisting of conjugated dienes and vinyl-substituted aromatic compounds in the presence of an organomonolithium initiator and reacting the resulting monolithium-terminated polymer with from 0.1 to about 1 equivalent based on the lithium in the polymer of a compound having at least three reactive sites capable of reacting with the carbon-lithium bone of the polymer, exclusive of organic reactant materials having halogen atoms that are attached to a carbon atom which is alpha to an activating group selected from the group consisting of an ether linkage, a carbonyl and a carbon-to-carbon double bond, thereby coupling said polymer with said compound.

In the most preferred embodiment, the composition can be described as a composition comprised of, based on the weight of the composition, an admixture of A. from 80 to 60 weight percent of a polyetherester having an inherent viscosity of at least 0.4 comprised of
  1. a dicarboxylic acid component comprised of terephthalic acid,
  2. a diol component comprised of
    a. a glycol comprised of 80–70 mole percent 1,4-cyclohexanedimethanol and 20–30 mole percent tetramethylene glycol, and
    b. 25–35 weight percent, based on the weight of the polyetherester, of poly(tetramethylene oxide) glycol having a molecular weight of about 1,000.

B. from 20 to 40 weight percent of a radial teleblock copolymer prepared by a method which comprises polymerizing from 60 to 80 mole percent butadiene and 40 to 20 mole percent styrene in the presence of an organomonolithium initiator and reacting the resulting monolithium-terminated polymer with from 0.1 to about 1 equivalent based on the lithium in the polymer of a compound having at least three reactive sites capable of reacting with the carbon-lithium bond of the polymer, exclusive of organic reactant materials having halogen atoms that are attached to a carbon atom which is alpha to an activating group selected from the group consisting of an ether linkage, a carbonyl and a carbon-to-carbon double bond, thereby coupling said polymer with said compound.

The first polyetherester useful in this invention can be broadly described as a poly(tetramethylene terephthalate type polyetherester.

As broadly described above, the dicarboxylic acid that is used in conjunction with terephthalic acid can be an aliphatic or aromatic dicarboxylic acid having a molecular weight of less than 300.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic and is included within the term "aliphatic dicarboxylic acid." Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups each attached to a carbon atom in an isolated or fused benzene ring. It is not necessary that both functional carboxyl groups be attached to the same aromatic ring and where more than one ring is present, they can be joined by aliphatic or aromatic divalent radicals containing other substituents such as —O— or —SO$_2$—.

Representative aliphatic dicarboxylic acids which can be used in this invention are sebacic acid, 1,3-cyclohexane dicarboxylic acid, 1,4-cyclohexane dicarboxylic acid, adipic acid, pimelic acid, suberic acid, sebacic acid, glutaric acid, succinic acid, carbonic acid, oxalic acid, azelaic acid, diethyl-malonic acid, allyl-malonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylenebis-(cyclohexane carboxylic acid), 3,4-furan dicarboxylic acid, and 1,1-cyclobutane dicarboxylic acid. Preferred aliphatic acids are 1,4-cyclohexane dicarboxylic acid, adipic acid, pimelic acid, suberic acid, azelaic acid, or sebacic acid.

Representative aromatic dicarboxylic acids which can be used include phthalic and isophthalic acid, dibenzoic acid, substituted dicarboxy compounds with two benzene nuclei such as bis(p-carboxyphenyl)-methane, 4,4'-oxydibenzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$–$C_{12}$ alkyl and ring substitution derivatives thereof, such as halo, alkoxy, and aryl derivatives. Hydroxyl acids such as p($\beta$-hydroxyethoxy) benzoic acid can also be used provided an aromatic dicarboxylic acid is also present. Aromatic carboxylic acids with 8–16 carbon atoms are preferred, particularly the phenylene dicarboxylic acids, i.e., phthalic and isophthalic acids.

In a preferred embodiment of this invention the dicarboxylic acid component is comprised of 85–60 mole percent terephthalic acid and 15–40 mole percent 1,4-cyclohexanedicarboxylic acid.

The term "dicarboxylic acids," as used with regard to the first polyetherester, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituents groups or combinations which do not substantially interfere with the copolyester polymer formation and use of the polymer of this invention.

While broadly the glycol that can be used to replace the tetramethylene glycol can be an aliphatic or aromatic glycol having a molecular weight of less than 300, more preferably the glycol can be an aliphatic or aromatic glycol having up to 12 carbon atoms. Examples of suitable glycols are ethylene, propylene, tetramethylene, pentamethylene, 2,2-dimethyltrimethylene, hexamethylene, and decamethylene glycols, dihydroxy cyclohexane, cyclohexane dimethanol, resorcinol, hydroquinone, 1,5-dihydroxy naphthalene, etc. Other suitable diols are aliphatic diols containing 2–8 carbon atoms. Included among the bisphenols which can be used are bis(p-hydroxy) diphenyl, bis(p-hydroxyphenyl) methane, and bis(p-hydroxyphenyl) propane. Equivalent ester-forming derivatives of diols are also useful. The term "aliphatic or aromatic glycol" as used herein includes equivalent ester-forming derivatives; however, the molecular weight requirement pertains to the diol only and not to its derivatives.

In a preferred embodiment of this invention the glycol can be 100 mole percent tetramethylene glycol.

As broadly described above, the poly(alkylene oxide) glycol useful in this invention can be described as a poly(alkylene oxide)glycol having 2, 3 or 4 carbon atoms in the repeating unit and having a molecular weight in the range of 400–5,000. In a preferred embodiment the poly(alkylene oxide)glycol can be described as a poly(tetramethylene oxide) glycol having a molecular weight in the range of 800–4,000 wherein the amount is 20–50 weight percent, based on the weight of the polyetherester. Examples of poly(alkylene oxide) glycols that can be used include poly(ethylene oxide) glycol, poly(propylene oxide) glycol and poly(tetramethylene oxide) glycol. These glycols are well known in the art and are disclosed in Defensive Publication T878,004 of Sept. 8, 1970, entitled "Poly(tetramethylene Glycol) Having a Narrow Molecular Weight Distribution And Its Manufacture," by Seaton et al.

It is essential in the first polyetherester that at least 60 mole percent of the dicarboxylic acid component be terephthalic acid and at least 60 mole percent of the diol component be tetramethylene glycol, sometimes called 1,4-butanediol. A further requirement of this invention is that the sum of the dicarboxylic acid that is not terephthalic acid, the glycol that is not tetramethylene glycol and the poly(alkylene oxide) glycol be within a certain range. Specifically, the sum of the total mole percent amount of aliphatic or aromatic dicarboxylic acid having a molecular weight of less than 300, the mole percent amount of aliphatic or aromatic glycol having a molecular weight of less than 300 and the weight percent, based on the weight of the polyetherester, of the poly(alkylene oxide) glycol must equal at least 35 but cannot exceed 80. For example, if 15 mole percent of the glycol is other than tetramethylene glycol and 10 mole percent of the dicarboxylic acid used is other than terephthalic acid, then the weight percent poly(alkylene oxide) glycol must be at least 10. Additionally, if 20 mole percent of the glycol is other than tetramethylene glycol and 40 mole percent of the dicarboxylic acid is other than terephthalic acid then the weight percent poly(alkylene oxide) glycol can be no greater than 20.

The first polyetheresters described herein are well known in the art and can be prepared in accordance with the disclosure of U.S. Pat. No. 3,013,914 and U.S. Pat. No. 3,763,109.

In this invention the first polyetherester has an inherent viscosity of at least 0.4 and preferably 0.6, or even higher, measured at about 25° C. using 0.5 percent of the polymer in a solvent composed of 60 percent by weight of phenol and 40 percent by weight of tetrachloroethane. Inherent viscosities of between 1.0 and 2.0 are often preferred.

The second polyetherester useful in this invention can be broadly described as a poly(1,4-cyclohexylenedimethylene terephthalate) type of polyetherester.

As reported earlier, the dicarboxylic acid component of the second polyetherester is comprised of 100–60 mole percent terephthalic acid and 0–40 mole percent of an aliphatic or aromatic dicarboxylic acid having a molecular weight of less than 300. The aliphatic and aromatic dicarboxylic acids disclosed to be useful with the first polyetherester are also useful with the second polyetherester.

The term "dicarboxylic acids," as used with regard to the second polyetherester, includes equivalents of dicarboxylic acids having two functional carboxyl groups which perform substantially like dicarboxylic acids in reaction with glycols and diols in forming copolyester polymers. For example, the term "dicarboxylic acids" include the bis alkyl ester, such as dimethyl terephthalate.

As disclosed previously, the glycol useful in the second polyetherester of this invention is a mixture of 1,4-cyclohexanedimethanol and a specific range of tetramethylene glycol or ethylene glycol. Minor amounts of other glycols can be used in conjunction with the mixture of 1,4-cyclohexanedimethanol and tetramethylene glycol or ethylene glycol as long as the unobvious properties of the composition of the invention are preserved. While broadly the glycol that can be used in conjunction with the 1,4-cyclohexanedimethanol and tetramethylene glycol can be an aliphatic glycol having a molecular weight of less than 300, in a preferred embodiment, the glycol can be an aliphatic glycol having up to 12 carbon atoms. Examples of suitable glycols are propylene, ethylene, pentamethylene, 2,2-dimethyltrimethylene, hexamethylene, and decamethylene glycols.

In one preferred embodiment of the invention, the diol component is comprised of 80–65 mole percent 1,4-cyclohexanedimethanol and 20–35 mole percent tetramethylene glycol. More preferably the diol component is comprised of 80–70 mole percent 1,4-cyclohexanedimethanol and 20–30 mole percent tetramethylene glycol.

As broadly described above, the poly(alkylene oxide) glycol useful in this invention is a poly(alkylene oxide) glycol having 2 to 4 carbon atoms in the repeating unit and having a molecular weight in the range of 400–2,000, preferably about 1000. Examples of poly(alkylene oxide) glycols that can be used include poly(ethylene oxide) glycol, poly(propylene oxide) glycol and poly(tetramethylene oxide) glycol. Copoly(alkylene oxide) glycols, such as poly(ethylene/propylene oxide) glycol, can be used. In a preferred embodiment, the poly(alkylene oxide) glycol can be poly(tetramethylene oxide) glycol. Glycols of the type useful in this invention are well known in the art.

In one preferred embodiment of the invention, 20–40 weight percent poly(alkylene oxide)glycol can be used. More preferably the poly(alkylene oxide) glycol is 25–35 weight percent.

The second polyetherester of this invention can be prepared in accordance with the disclosure of U.S. Pat. Nos. 3,023,192, 3,013,914 and 3,763,109.

In this invention the second polyetherester has an inherent viscosity of at least 0.4 and preferably 0.6, or even higher, measured at about 25° C. using 0.5 percent of the polymer in a solvent composed of 60 percent by weight of phenol and 40 percent by weight of tetrachloroethane.

In this invention from 95 to 50, preferably 80 to 60 weight percent, of the first or second polyetherester, based on the weight of the admixture, can be used.

The radial teleblock copolymer useful in this invention is an elastomeric rubbery type polymer consisting of several conjugated diene chains, such as polybutadiene, extending from a central hub with each polymerized conjugated diene branch terminated by a block of a vinyl-substituted aromatic compound, such as styrene. The polymerized conjugated diene and blocks of vinyl-substituted aromatic compound are incompatible and form a two-phase system consisting of "domains"

of glassy polymerized vinyl-substituted compound interconnected by flexible polymerized conjugated diene chains. The domains of polymerized vinyl-substituted aromatic compound served to crosslink and reinforce the structure, giving rise to an elastomeric network which behaves as though it were filled and chemically crosslinked. These polymers and their preparation are thought to be disclosed in U.S. Pat. No. 3,281,383. These polymers are sold commercially by Phillips Petroleum Company under the trade name Solprene.

In accordance with U.S. Pat. No. 3,281,383 the radial teleblock copolymer can be prepared by a method which comprises polymerizing monomers selected from the group consisting of conjugated dienes and vinyl-substituted aromatic compounds in the presence of an organomonolithium initiator and reacting the resulting monolithium-terminated polymer with from 0.1 to about 1 equivalent based on the lithium in the polymer of a compound having at least three reactive sites capable of reacting with the carbonlithium bond of the polymer, exclusive of organic reactant materials having halogen atoms that are attached to a carbon atom which is alpha to an activating group selected from the group consisting of an ether linkage, a carbonyl and a carbon-to-carbon double bond, thereby coupling said polymer with said compound. In a preferred embodiment the conjugated diene is butadiene and the vinyl-substituted aromatic is styrene. Preferably, the amount of butadiene is 60 to 80 mole percent and the amount of styrene is 40 to 20 mole percent.

The composition of this invention can be prepared according to techniques well known in the art. For example, granules of the polyetherester and radial teleblock copolymer can be dry blended and extruded. Also the components can be melt blended with conventional equipment, such as a Banbury type mixer. Preferably the materials can be blended by continuous melt mixing the materials.

The compositions of this invention can be molded into useful articles using conventional apparatus and techniques. For example, articles can be prepared from the compositions of this invention using conventional injection molding equipment and methods.

The properties of the composition of the invention can be modified by incorporation of various conventional additives such as pigments, inorganic fillers such as carbon black, silica gel, alumina, clays, chopped fiber glass, and flame retardants. Suitable conventional stabilizers can be added if desired.

As has been described, the compositions of this invention exhibit the combination of a desirable overall balance of general mechanical properties and an unobviously high elastic recovery. In order to illustrate the desirable combination of properties of the compositions of this invention, a series of comparative experiments are conducted.

A composition of the invention is prepared as shown below:
A. 75 weight percent of the first polyetherester having an inherent viscosity of 1.36 comprised of
 1. a dicarboxylic acid component comprised of
  A. 70 mole percent terephthalic acid, and
  B. 30 mole percent 1,4-cyclohexanedicarboxylic acid,
 2. a diol component comprised of
  A. tetramethylene glycol, and
  B. 25 weight percent, based on the weight of the polyetherester, of poly(tetramethylene oxide) glycol having a molecular weight of about 1,000,
B. 25 weight percent of a radial teleblock copolymer sold commercially by Phillips Petroleum Company under the trade name Solprene 411C, which is thought to be prepared by polymerizing about 70 mole percent butadiene and about 30 mole percent styrene in accordance with the process disclosed in U.S. Pat. No. 3,281,383.

A similar composition of the invention is prepared using 50 weight percent polyetherester and 50 weight percent radial teleblock copolymer.

Two similar compositions are prepared wherein a diblock copolymer is used in place of the radial teleblock copolymer. The diblock copolymer is prepared by the sequential polymerization of about 75 mole percent butadiene and about 25 mole percent styrene.

Components A and B of all four compositions are mixed thoroughly by extrusion to form an admixture which is injection molded into ASTM D412 Type A test specimens using a 23° C. mold on a New Britain injection molding machine.

In order to investigate the elastic recovery of all four of these compositions the tensile set of the test specimens is measured after 200% tensile elongation in accordance with ASTM Method D412 and is reported in percent. The tensile set value for all four samples is shown below. As is well known in the art, the lower the tensile set the greater the elastic recovery.

|  | Composition Containing 25 Weight Percent | | Composition Containing 50 Weight Percent | |
| --- | --- | --- | --- | --- |
|  | Diblock Copolymer | Radial Teleblock Copolymer | Diblock Copolymer | Radial Teleblock Copolymer |
| Tensile set after 200% elongation, % | 107 | 77 | 106 | 40 |

As will be readily appreciated from a consideration of these data, the lower tensile set of the compositions of the invention, composed of the polyetherester and a radial teleblock copolymer, is much lower than the tensile set of similar compositions of the polyetherester and a diblock copolymer. The lower value of tensile set means a greater elastic recovery.

Further tests confirmed that the overall balance of general mechanical properties of the compositions of the invention, containing the radial teleblock copolymer, is quite acceptable while the overall balance of general mechanical properties of the compositions of the prior art, containing the diblock copolymer, is not acceptable for typical commercial applications. Representative data for the overall balance of general mechanical properties of both compositions are given below.

|  | Composition Containing 25 Weight Percent | | Composition Containing 50 Weight Percent | |
| --- | --- | --- | --- | --- |
|  | Diblock Copolymer | Radial Teleblock Copolymer | Diblock Copolymer | Radial Teleblock Copolymer |
| Flexural stiffness, psi | 9500 | 12,500 | 6400 | 8800 |
| Hardness, Shore D | 36 | 45 | 25 | 40 |
| Tensile strength, | 2360 | 2600 | 1230 | 2100 |

|  | Composition Containing 25 Weight Percent | | Composition Containing 50 Weight Percent | |
|---|---|---|---|---|
|  | Diblock Copolymer | Radial Teleblock Copolymer | Diblock Copolymer | Radial Teleblock Copolymer |
| psi |  |  |  |  |

A second composition of the invention is prepared as shown below:
A. 75 weight percent of the second polyetherester having an inherent viscosity of 1.29 comprised of
 1. terephthalic acid
 2. a diol component comprised of
   A. a mixture of 73 mole percent 1,4-cyclohexanedimethanol and 27 mole percent tetramethylene glycol, and
   B. 30 weight percent, based on the weight of the polyetherester, of poly(tetramethylene oxide) glycol having a molecular weight of about 1,000,
B. 25 weight percent of the radial teleblock copolymer sold commercially by Phillips Petroleum Company under the trade name Solprene 411C.

Two similar compositions are prepared wherein the diblock copolymer of the previous example is used in place of the radial teleblock copolymer.

Components A and B of both compositions are mixed thoroughly by extrusion to form an admixture which is injection molded into ASTM D412 Type A test specimens using a 60° C. mold on a New Britain injection molding machine.

The tensile set of these compositions after 200% tensile elongation, measured according to ASTM D412, is shown below.

|  | Composition Containing 25 Weight Percent | |
|---|---|---|
|  | Diblock Copolymer | Radial Teleblock Copolymer |
| Tensile set after 200% elongation, % | 94 | 75 |

Again, the much lower tensile set of the composition containing the radical teleblock copolymer is demonstrated.

Further data showing the superior balance of general mechanical properties obtained with compositions containing the radial teleblock copolymer compared with those containing the diblock copolymer are given below.

|  | Composition Containing 25 Weight Percent | |
|---|---|---|
|  | Diblock Copolymer | Radial Teleblock Copolymer |
| Flexural Stiffness, psi. | 7900 | 13,500 |
| Hardness, Shore D | 45 | 52 |
| Tensile Strength, psi. | 2500 | 3100 |
| Tensile Elongation to Break, % | 226 | 480 |

Although the invention has been described in considerable detail with particular reference to certain preferred embodiments thereof, variations and modifications can be effected within the spirit and scope of the invention.

We claim:
1. A composition comprised of, based on the weight of the composition, an admixture of
  A. from 95 to 50 weight percent of a polyetherester having an inherent viscosity of at least 0.4 selected from the group consisting of
    1. a first polyetherester comprised of
      A. a dicarboxylic acid component comprised of
        a. 100–60 mole percent terephthalic acid, and
        b. 0–40 mole percent of an aliphatic or aromatic dicarboxylic acid having a molecular weight of less than 300, and
      B. a diol component comprised of
        a. a glycol comprised of 100–60 mole percent tetramethylene glycol and 0–40 mole percent of an aliphatic or aromatic glycol having a molecular weight of less than 300, and
        b. 10–60 weight percent, based on the weight of the polyetherester, of a poly(alkylene oxide)glycol having 2, 3, or 4 carbon atoms in the repeating unit and having a molecular weight in the range of 400 to 5,000,
      wherein the sum of the total mole percent amount of aliphatic or aromatic dicarboxylic acid having a molecular weight of less than 300 in part 1.A.(1)(A)(b), the mole percent amount of aliphatic or aromatic glycol having a molecular weight of less than 300 in part 1.A.(1)(B)(a), and the weight percent, based on the weight of the polyetherester, of the poly(alkylene oxide)glycol in part 1.A.(1)(B)(b) equals at least 35 but does not exceed 80,
    2. a second polyetherester comprised of
      A. a dicarboxylic acid component comprised of
        a. 100–60 mole percent terephthalic acid, and
        b. 0–40 mole percent of an aliphatic or aromatic dicarboxylic acid having a molecular weight of less than 300, and
      B. a diol component comprised of
        a. a glycol comprised of 90–60 mole percent 1,4-cyclohexanedimethanol and 10–40 mole percent ethylene glycol or tetramethylene glycol, and
        b. 10–50 weight percent, based on the weight of the polyetherester, of a poly(alkylene oxide)glycol having 2 to 4 carbon atoms in the repeating unit and having a molecular weight in the range of 400 to 2,000,
  B. from 5 to 50 weight percent of a radial teleblock copolymer prepared by a method which comprises polymerizing monomers selected from the group consisting of conjugated dienes and vinyl-substituted aromatic compounds in the presence of an organomonolithium initiator and reacting the resulting monolithium-terminated polymer with from 0.1 to about 1 equivalent based on the lithium in the polymer of a compound having at least three reactive sites capable of reacting with the carbon-lithium bond of the polymer, exclusive of organic reactant materials having halogen atoms that are attached to a carbon atom which is alpha to an activating group selected from the group consisting of an ether linkage, a carbonyl and a carbon-to-carbon double bond, thereby coupling said polymer with said compound.

2. The composition of claim 1 wherein the first polyetherester ester of part 1.A.(1) is comprised of
   A. a dicarboxylic acid component comprised of
      a. 85–60 mole percent terephthalic acid, and
      b. 15–40 mole percent of 1,4-cyclohexanedicarboxylic acid,
   B. a diol component comprised of
      a. 100 mole percent of a glycol comprised of tetramethylene glycol, and
      b. 20–50 weight percent, based on the weight of the polyetherester, of poly(tetramethylene oxide)glycol having a molecular weight in the range of 800–4,000.

3. The compositions of claim 1 wherein the second polyetherester of part 1.A.(2) is comprised of
   A. a dicarboxylic acid component comprised of terephthalic acid,
   B. a diol component comprised of
      a. a glycol comprised of 80–65 mole percent 1,4-cyclohexanedimethanol and 20–35 mole percent tetramethylene glycol, and
      b. 20–40 weight percent, based on the weight of the polyesterether, of poly(tetramethylene oxide)glycol having a molecular weight in the range of 400 to 2,000.

4. The composition of claim 1 wherein the conjugated dienes and vinyl-substituted aromatic compounds of part 1.B. are butadiene and styrene.

5. The composition of claim 4 wherein the amount of butadiene is 60 to 80 mole percent and the amount of styrene is 40 to 20 mole percent.

6. The composition of claim 1 wherein the amount of component A. is 80 to 60 weight percent and the amount of component B. is 20 to 40 weight percent.

7. A composition comprised of, based on the weight of the composition,
   A. from 80 to 60 weight percent of a polyetherester having an inherent viscosity of at least 0.4 comprised of
      1. a dicarboxylic acid component comprised of terephthalic acid,
      2. a diol component comprised of
         a. a glycol comprised of 80–70 mole percent 1,4-cyclohexanedimethanol and 20–30 mole percent tetramethylene glycol, and
         b. 25–35 weight percent, based on the weight of the polyetherester, of poly(tetramethylene oxide) glycol having a molecular weight of about 1,000,
   B. from 20 to 40 weight percent of a radial teleblock copolymer prepared by a method which comprises polymerizing from 60 to 80 mole percent butadiene and 40 to 20 mole percent styrene in the presence of an organomonolithium initiator and reacting the resulting monolithium-terminated polymer with from 0.1 to about 1 equivalent based on the lithium in the polymer of a compound having at least three reactive sites capable of reacting with the carbonlithium bond of the polymer, exclusive of organic reactant materials having halogen atoms that are attached to a carbon atom which is alpha to an activating group selected from the group consisting of an ether linkage, a carbonyl and a carbon-to-carbon double bond, thereby coupling said polymer with said compound.

* * * * *